(12) United States Patent
Der et al.

(10) Patent No.: US 6,648,949 B1
(45) Date of Patent: Nov. 18, 2003

(54) SYSTEM FOR SMALL PARTICLE AND $CO_2$ REMOVAL FROM FLUE GAS USING AN IMPROVED CHIMNEY OR STACK

(75) Inventors: Victor K. Der, Gaithersburg, MD (US); Jer-Yu Shang, McLean, VA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 79 days.

(21) Appl. No.: 09/994,824

(22) Filed: Nov. 28, 2001

(51) Int. Cl.[7] .................................................. B01D 53/14
(52) U.S. Cl. ............................ 96/316; 96/321; 435/266
(58) Field of Search ........................ 435/266; 55/459.1, 55/456, 457; 95/216, 271; 96/314, 315, 316, 321, 308, 301

(56) References Cited

U.S. PATENT DOCUMENTS

| | | | | |
|---|---|---|---|---|
| 793,110 A | * | 6/1905 | Uehling | |
| 1,102,996 A | * | 7/1914 | Bottenstein | |
| 1,799,084 A | * | 3/1931 | Brdar | |
| 3,330,231 A | * | 7/1967 | Spencer | |
| 3,395,656 A | * | 8/1968 | Ford et al. | |
| 3,582,051 A | * | 6/1971 | Klein | |
| 3,605,386 A | * | 9/1971 | Erwin et al. | |
| 3,660,045 A | * | 5/1972 | Gladu | |
| 3,716,967 A | * | 2/1973 | Doyle, Jr. et al. | |
| 3,733,788 A | * | 5/1973 | Crowley | |
| 3,760,567 A | * | 9/1973 | Stalker | |
| 3,984,220 A | * | 10/1976 | Curchod | |
| 4,019,882 A | * | 4/1977 | Herrera | |
| 4,149,901 A | * | 4/1979 | Morales | |
| 4,235,607 A | | 11/1980 | Kimder et al. | |
| 4,392,875 A | * | 7/1983 | Celis | |
| 4,529,421 A | * | 7/1985 | Parma | |
| 5,364,611 A | | 11/1994 | Iijima et al. | |
| 5,397,553 A | | 3/1995 | Spencer | |
| 5,560,756 A | * | 10/1996 | Zeritis | |
| 6,083,740 A | * | 7/2000 | Kodo et al. | |

* cited by examiner

*Primary Examiner*—Duane S. Smith
(74) *Attorney, Agent, or Firm*—Julia Cook Moody; Paul A. Gottlieb

(57) ABSTRACT

A novel stack application for improved carbon dioxide and particle removal/collection from flue gases produced during coal power-generation processes. Flue gas tangential inlet velocity is increased to subject upward-flowing flue gas in a stack to a centrifugal force, thereby propelling entrained solid particles and $CO_2$ in the flue gas to the stack wall for collection. Collection efficiency is further improved by a cascading water film or algae-laden water film on the inside of the stack wall and on surfaces of an optional internally mounted vortex generator to eliminate the re-entrainment of small particles and for ease of transporting the captured particles in a slurry. The stack can also be utilized as a photochemical or a biological reactor to promote a photosynthesis reaction between carbon dioxide and algae-laden water to form carbohydrate substrates for carbon dioxide sequestration and utilization.

16 Claims, 3 Drawing Sheets

SYSTEM FOR SMALL PARTICLE AND CO$_2$ REMOVAL FROM FLUE GAS USING AN IMPROVED CHIMNEY OR STACK

BACKGROUND OF THE INVENTION a) Field of the Invention

The invention is a novel stack application related to improved carbon dioxide and particle removal and collection from flue gases produced during coal power-generation processes. More particularly, the invention is related to the direct sequestration of carbon dioxide in pulverized coal fired plants.

b) Description of Related Art

Combustion of carbonaceous materials accounts for the majority of the heat energy generated from fossil fuels. Heat energy is used to generate electrical power and/or for heating applications. Energy produced from combustion of carbonaceous materials constitutes more than 50% of the power and heat production. The final products of the combustion of fossil fuels for power generation are gaseous products, such as carbon oxides, and ash particles. Sulfur and nitrogen compounds in coal may form oxides during the combustion process. Means have been developed by those who are skilled in the art to address the formation, control and post combustion removal of the oxides of sulfur and nitrogen. These gaseous oxides tend to form acids of sulfur and nitrogen, and therefore they are called "acid gases". Acid gas emission control processes are reported in various technical references and textbooks, and therefore further explanation of such is not necessary.

Traditionally, after the post combustion treatments of the oxides of sulfur, nitrogen, and other particles, the flue gas still contains a minute amount of particles, which may not be feasible for removal by conventional particle or dust removal processes, such as electrostatic precipitation and fabric filtration. Electrostatic precipitation is unable to capture small particles in the near micro or sub-micron size range. This is indicated in most commercially available electrostatic precipitator particle collection units by efficiency curve data. As the particle size approaches a sub-micron size, the collection efficiency drops drastically. Additional improvement of particle capture efficiency can be expected by increasing the residence time for the flue gas inside the electrostatic precipitator train, which can be achieved by adding more electrostatic precipitation units. However, economical, technical, and space or "foot print" considerations may rule out the option of additional residence time being provided by this method. This problem is acute for most of the existing coal-fired power plants.

Electrostatic precipitation (ESP) is an age-proven technology for the capture of fine particles from coal combustion. An electrostatic force is generated by the electrically charged particles and an electrically charged electrode causes the particles to migrate to collecting surfaces possessing an opposing electrical charge. One design consideration is the time for the charged particles to migrate to the collecting surface, which should be shorter than the particle residence time in the ESP confinement. Economic constraints may dictate the optimum design for the ESP dust collector. Variations in the electrical resistivity of the dust particles may also affect the ability of the particles to retain an electric charge. Resistivity of the particles may drastically reduce the intended dust collection efficiency. Industrial field data of electrostatic precipitator performance often show a drop in the collection efficiency for the sub-micron particles. This is mostly due to Brownian or Maxellian motions of small particles.

Alternatively, the use of fabric filtration utilizes the impaction, interception, and random motion of the particles on a fabric target for capture. Because of the low inertia of the small particles, the particles remain within the confinement of the stream lines, or become entrained in the stream lines of the filtering flue gas stream. Therefore, the particles are less likely to wander out of the confinement of these stream lines, and be captured by impaction and/or interception. The chances of random movement of the small particles being captured are even less. As a consequence, even with fabric filters, the likelihood of achieving sub-micron particle capture is not promising. Granted, the retention efficiency can be increased at the expense of deep filtration with a high pressure drop.

Sub-micron particles are a major recent concern for the public. The deposition of respirable particles inside human lungs can lead to the cause of emphysema and many respiratory diseases. The recent promulgation by the U.S. Environmental Protection Agency (EPA) on sub-micron size particle control regulations will add to the aforementioned considerations for design and operation of carbonaceous fuel power generation plants. Small particles and aerosols may elude the capture of thin felt or fabric filters, which have a lower number of fibers for, capture. The use of filtration technology for small particle removal is very similar to that of an ANDERSON IMPACTOR® air sampler for small particle retention. These mechanisms for small particle retention, such as impaction, interception and random motion, are still useful in somewhat limited applications. Emission control of sub-micron size particles needs to be addressed, however.

From an engineering or accounting point of view, the build up of carbon dioxide in the atmosphere is a matter of inventory. Inventory of carbon dioxide is the net result of carbon dioxide input, or generation, minus the carbon dioxide output, or depletion. One must keep in mind that carbon dioxide is formed in a matter of seconds by means of combustion or other related processes. The consumption of carbon dioxide is carried out in terms of bio-chemical or physiological reactions, generally several orders slower than the combustion processes. From an economic point of view, installations other than Mother Nature will be immense in scale and consequently costly in investment.

Addressing the carbon dioxide issue can be cost prohibitive. There is no apparent economical incentive for the developing countries to abide by practices for carbon dioxide sequestration. Many businesses in developed countries are reluctant to reduce their carbon dioxide emissions while developing countries continue to generate carbon dioxide. The production of economically attractive by-products may induce developing countries to adopt the practice of including carbon dioxide sequestration in their fossil fuel power plants. This appears to be logical, and conducive for carbon dioxide sequestration.

Another consideration for the installation of carbon dioxide sequestration facilities in conventional coal or carbonaceous power plants is the space or "foot print" concern. Age-old coal firing power plant design practices leave very little space for an after-thought addition for pollution and carbon dioxide sequestration equipment.

The smoke stack is an ancient solution to the dispersion of flue gas and the products of combustion. The requirement to spread the products of combustion to a wide area or space calls for a tall structure. To facilitate the large volume disposal and dispersing of the gaseous products of combustion and its accompanying fine particles, an induction fan is required to move the gaseous products of combustion up through the stack or chimney. The thermo-siphon effect of the hot flue gas will also propel the gaseous products through the stack. In the past, the chimney or stack served a singular purpose of dispersing the gaseous products of combustion. There are numerous articles and software dealing with stack selection and design in the literature. Therefore, it will be redundant to retell the state of the art in stack design.

A main component of the United States power generation systems is the conventional pulverized coal-fired boiler, which produces high pressure and high temperature steam for electrical power generation in a traditional Rankine cycle. More than half of the U.S. domestic electric power is derived from conventional pulverized coal-fired power generation systems. Eighty-five percent of power generation for transportation and power generation is produced by the combustion of fossil fuels. The current concern for global warming is believed to be partially due to carbon dioxide emissions from fossil fuel combustion by internal combustion engines and from power generation. Measures to reduce carbon dioxide emission appear to be a logical avenue. Attempts to reduce the emission of carbon dioxide through energy conversion efficiency improvement were determined to be limited. As pointed out by a recent study by the Massachusetts Institute of Technology (MIT), the most cost effective avenue would be the direct sequestration of carbon dioxide.

The direct sequestration of carbon dioxide from mobile sources, i.e. motor vehicles, has been found to be inadequate and impractical. Given that the largest fraction of power generation comes from coal, the main avenue open would be the direct sequestration of carbon dioxide from coal-fired power generation plants. An emerging power generation activities in the world is direct coal combustion. There are few discernible means of coal power generation in the distant future other than conventional coal firing. Therefore, direct sequestration of carbon dioxide in the pulverized coal directly in coal-fired power plants is an attractive alternative solution.

Carbon dioxide, which has been excited by light, can be induced to react with water in the presence of chlorophyll. This is known as the photosynthesis reaction. There is no need to have an elaborate discussion of the photosynthesis reaction here, as there are many publications available on this subject. However, the primary product of carbon dioxide and water that undergo a light accelerated photosynthesis reaction in the presence of chlorophyll is glucose. Glucose is a stable carbohydrate, which can be used as animal feed, for alcohol fuel production, and as nutrients for plant growth.

Water, carbon dioxide and chlorophyll in algae are plentiful in the coal-fired power plant cooling water ponds. One question is how to obtain the light necessary to accelerate the photosynthesis chemical reaction. To look directly into the open flames inside a pulverized coal boiler combustion chamber with the naked eye is not feasible. A light shield (cobalt glass) usually is used to protect human eyes from the light of the flame. As the highly excited carbon dioxide gaseous molecules, formed from coal combustion, drop to a lower energy state, light is emitted. This light is in the infrared range and capable of the excitation of carbon dioxide gaseous molecules in the flue gas. Moreover, it is also known that a mixed light source, such as sunlight, can also prompt a photosynthesis reaction. It is not possible for the excited carbon dioxide molecules to react inside the highly oxidative combustion environment. Any products formed by the irradiation of carbon dioxide by infra-red light will be readily oxidized. In this environment, chlorophyll will simply be incinerated.

Conventional coal-fueled boilers have two essential elements, a combustion chamber to generate heat by fossil fuel combustion, and a heat recovery section to recover the heat of combustion by steam generation. The products of coal combustion are cooled and prepared for disposal. A stack or chimney is used to disperse the gaseous combustion products.

SUMMARY OF THE INVENTION

The advantages over the above described prior art and objects of the invention involving novel uses of a stack, follow.

It is an object of the invention to provide a means for a carbonaceous firing power plant to generate a by-product which is useable for producing fertilizer and/or animal feed stocks, to defray the cost of including carbon dioxide sequestration systems in existing power plants.

It is a further object of the invention to utilize existing equipment by means of a dual-functional application to reduce the cost of complying with the needs of adding pollution control and/or carbon dioxide sequestration systems.

It is another object of the invention to provide a system fully compatible with existing pulverized coal coal-fired power plants. Supporting facilities, such as cooling water ponds and related systems, can also serve as a surge tank for algae growth.

A specific object of the invention is to produce glucose as a by-product, which can be used as a nutrient for plant and animal growth. Algae are food for fish that thrive on glucose-containing water.

It is a further object of the invention to achieve a reduction in fine dust by virtue of a long residence time in a centrifugal force field and cascading aqueous streams to prevent re-entrainment of captured dust particles.

An advantage of the invention is to offer no added "foot-print" concerns. The stack is an existing structure with plenty of space for the dual functions of dust capture and carbon dioxide sequestration.

A further advantage provided by the invention is that it is not capital intensive and it can also generate useful by-products for developing countries in Asia, South America, Africa and the former Soviet Union countries in Eastern Europe. Such countries have an economic incentive to try this approach, because of the added by-products and potential cost benefits.

In accordance with the invention, light extracted from the coal combustion chamber is used to accelerate or excite the carbon dioxide—water reaction in the presence of algae, inside a stack or other facilities where carbon dioxide and water come into contact, to form a glucose-like material for carbon dioxide sequestration.

Collection efficiency is improved by a cascading water film on the inside of the stack, and on surfaces of an optional internally mounted vortex generator, eliminating the re-entrainment of small particles and facilitating transport of the captured particles in the form of low concentration slurry.

The stack can also be utilized as a photo-chemically activated or biological reactor to promote the photosynthesis reaction between carbon dioxide and algae-laden water to form a carbohydrate substrate for carbon dioxide sequestration and utilization. The most prevalent product of the photosynthesis reaction would be glucose and/or its likes. Glucose is most useful for fertilizer and animal feed materials.

The vortex generator can also be made of light transmitting materials such as fiber optical material, which can transmit and emit light to promote photochemical reactions.

The vortex generator may also be made in the form of perforated plates and baffles to increase the contact between carbon dioxide rich flue gas and water in the presence of chlorophyll materials.

The increase in the flue gas tangential inlet velocity in a stack subjects upward-flowing flue gas to a centrifugal force field, thereby propelling entrained solid particles in the flue gas to the stack wall for more efficient collection.

BRIEF DESCRIPTION OF THE DRAWINGS

The above-mentioned advantages and objects of the present invention will further become apparent when taken with the detailed description of the invention and with the drawings in which.

DETAILED DESCRIPTION OF THE INVENTION

Figure 1:
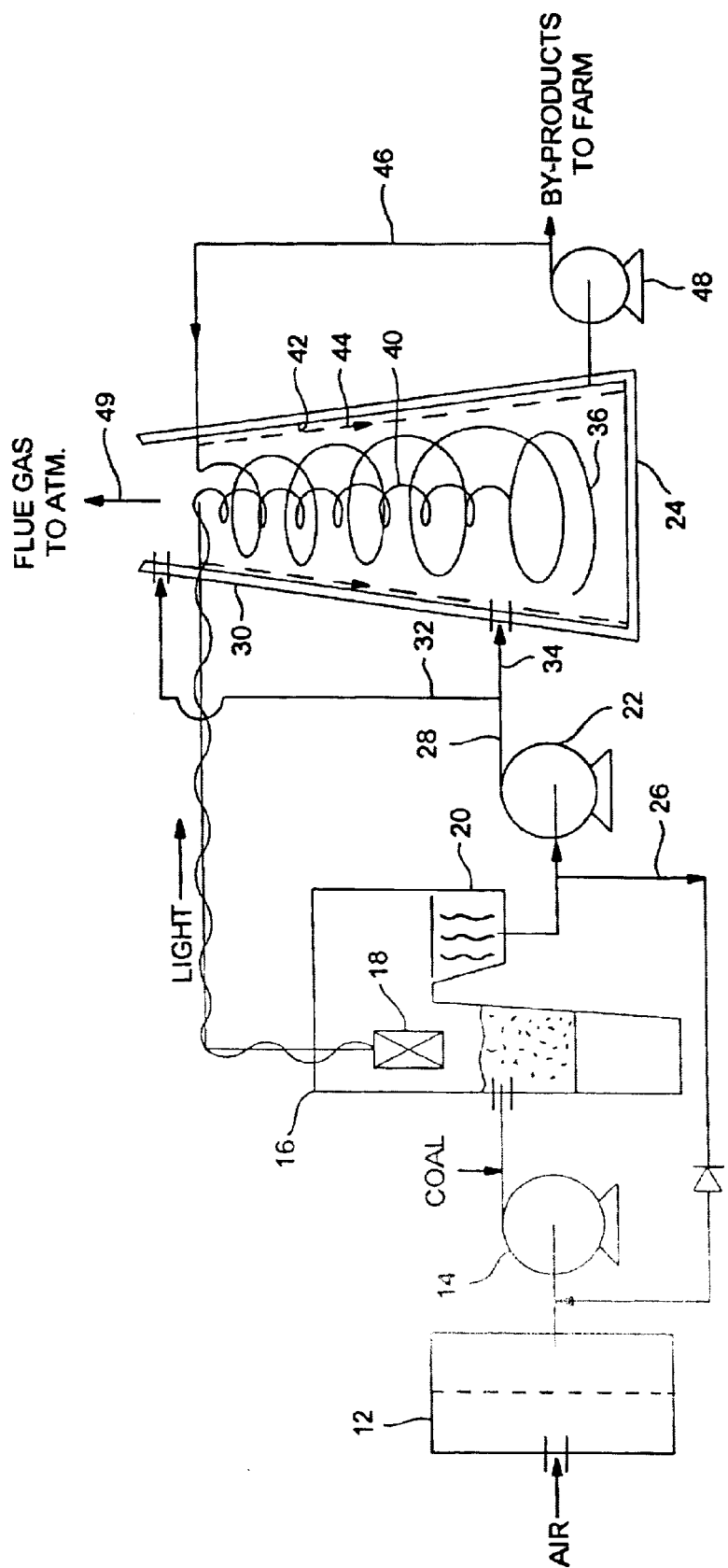
FIG. 1 is a schematic diagram of a novel stack application for carbon dioxide sequestration in a coal power generation system according to the present invention.

Referring now to FIG. 1, the present invention of a novel stack application for carbon dioxide sequestration is depicted in a coal power generation process.

Air is pumped through an oxygen permeable membrane 12 to remove a substantial portion of the nitrogen from the air. The oxygen enriched air is pumped by fan 14 and joins with pulverized coal. The oxygen-rich air and pulverized coal are burned together in the combustion chamber 16 of a coal-fired boiler. A light extraction device 18 is strategically located inside the combustion chamber 16, to collect the light emitted as a result of the combustion of the coal. One of the means of extracting light from a combustion system is a laser. After combustion, the excited carbon dioxide molecules produced within the combustion chamber 16 drop to a lower energy level, and light is emitted. The principle is no different from any other conventional chemical or carbon dioxide laser known to those skilled in the art. The light collected by the light extraction device is later utilized inside the stack for the photosynthesis of carbon dioxide and algae-laden water, as indicated in the drawing.

The coal combustion products, mostly ash particles and carbon dioxide, are then moved to a heat extraction section 20, where heat transfer surfaces are employed for steam generation by the extracted heat of combustion. The flue gases, after the settling of most of the ash, are moved by an induced draft fan 22 to the stack 24. After the removal of oxides of nitrogen and sulfur from the flue gases by conventional acid-gas emission control processes (not shown here), the flue gas is split into two streams 26, 28. Stream 26 recycles to the combustion chamber 16 as flue gas recirculation to control the coal flame temperature. The other flue gas stream 28 is sent to the upper section 30 of the stack 24 for dust removal, reheating of flue gas (after contact with the algae slurry), and sequestration of carbon dioxide.

The net effort is the production of a highly concentrated carbon dioxide steam to the stack 24 for carbon dioxide sequestration. Cost studies at MIT have shown that concentrated $CO_2$ separation, followed by sequestration, can reduce the cost of $CO_2$ sequestration from $45/ton to $15/ton of carbon dioxide.

Before entering the stack 24, the flue gas is again split into two streams. Stream 32 feeds the upper section 30 of the stack for reducing the humidity of the flue gas by dilution and heating. The other carbon dioxide rich flue gas stream 34 enters the stack 24 in a tangential direction as indicated by the arrow, and generates swirls or vortices 36 moving the top of the stack. The swirls sequester the $CO_2$ and enhance dust removal by creating a centrifugal force which forces the dust particles and $CO_2$ to the stack wall for collection. By entering the stack in a tangential direction relative to the circular cross-section of the stack, and by increasing the inlet velocity of the flue gas stream 34, the centrifugal force field is maximized and collection efficiency is improved. The up-flowing vortices 36 can also be generated and maintained by the insertion of a twisted spiraling optical fiber ribbon 40, which induces an upward vortexing action and provides ample exposure of light for the excitation of carbon dioxide.

Inside the stack interior 42, a cascading stream 44 is provided by the circulating water or algae laden water stream 46 to the top of the stack 24. The walls of the stack can be lined with corrosion resistant coatings to prevent stack deterioration. As the water-algae mixture cascades along the stack wall, the photosynthesis reaction will take place, as previously described, due to the light supplied to the stack by the light extraction device 18. The algae are a biomass which provides chlorophyll and growth sites for the production of additional biomass, i.e., glucose. The final by-product 48 is outputted in a slurry form and is a glucose by-product useful for plant and animal life. Flue gas 49 is released to the atmosphere, having dust particles removed and the sequestration of carbon dioxide completed.

The cascading of the water-algae mixture 46 can also be implemented on the surface of the optical fiber ribbon 40, which may be appropriately packed to assure adequate carbon dioxide and water contacts.

The carbon dioxide exciting light source emits light inside the stack from the ribbons 40 of fiber-optic material. The ribbons 40 serve a dual function by guiding the vortex swirls upwardly inside the stack and promoting vigorous mixing for the photosynthesis reaction. The twisted ribbons 40 facilitate the induction of the vortex swirls 36, providing contact surfaces for the flue gas and aqueous solutions (discussed herein) and/or slurry of algae inside the stack 24, and facilitate photosynthesis reaction by providing a light source.

The upward vortex swirls 36 also generate a strong and lasting centrifugal force field. Dust particles inside the stack are prompted by the centrifugal force field to move toward the stack wall for collection.

The vortex generator preferably is made of light transmitting materials such as fiber optic material, which can transmit and emit light to promote photochemical reactions. The vortex generator may also be made in the form of perforated plates and baffles, to increase contact between carbon dioxide rich flue gas and water in the presence of chlorophyll active materials.

Figure 2:
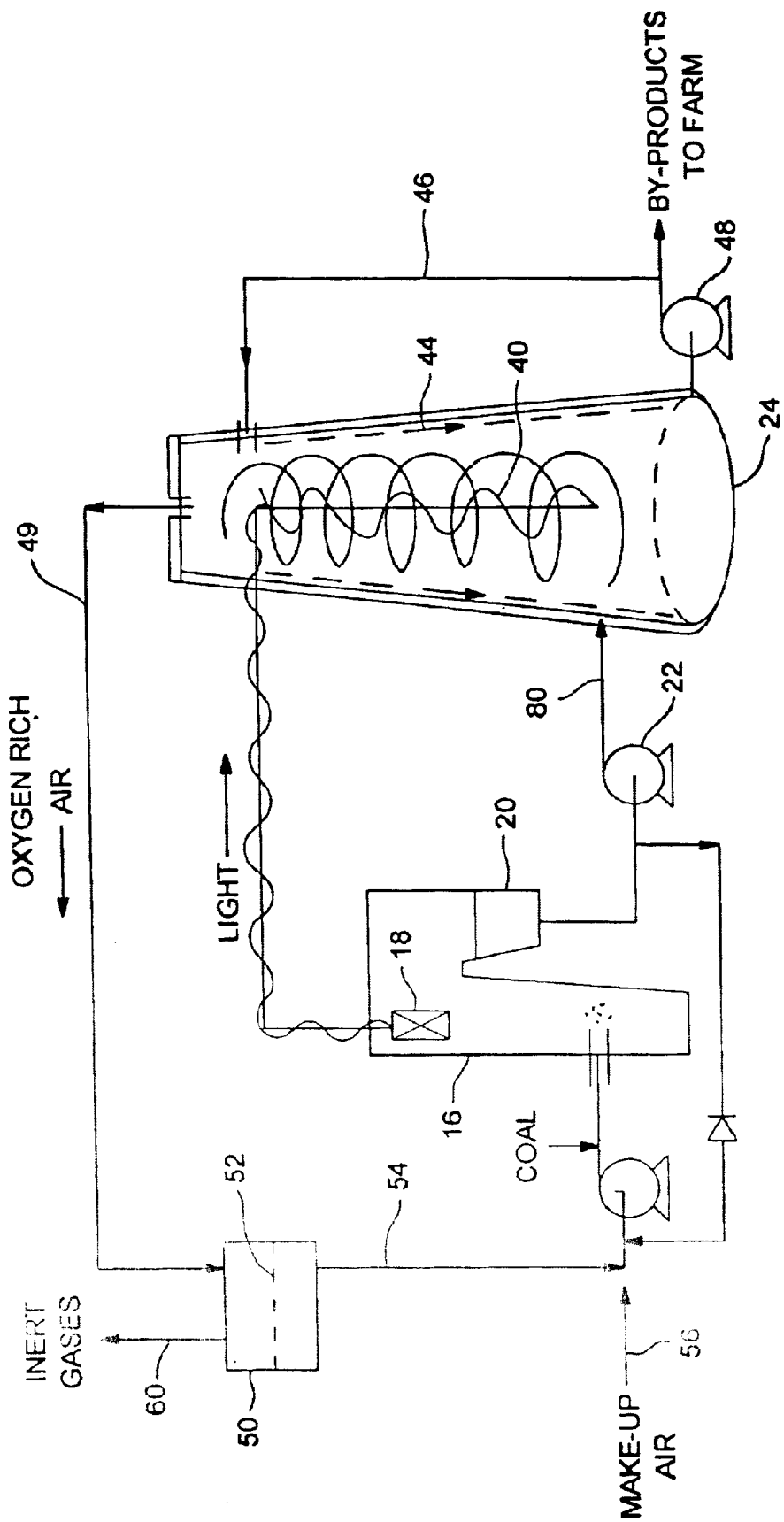
FIG. 2 illustrates a second embodiment of the invention, which achieves virtually zero carbon dioxide output.

Referring now to FIG. 2, a second embodiment of the invention is illustrated. Virtually zero carbon dioxide emission power generation is achieved by recycling the oxygen-rich flue gas 49 through an oxygen separation device 50. In this case, an oxygen permeable membrane 52 is used. This separation provision generates a high concentration of oxygen 54 from the oxygen separation device 50, and is then mixed with make-up oxygen 56 from air. The mix is then recycled into the pulverized coal fired boiler 16, with the other aforementioned features in place (like features are depicted by the same reference numerals as shown in FIG. 1). The oxygen permeable membrane 52 filters the carbon dioxide sequestrated flue gas 49 from the stack, and allows only inert gases 60 to be released to the atmosphere, with virtually zero carbon dioxide emissions.

Figure 3A:
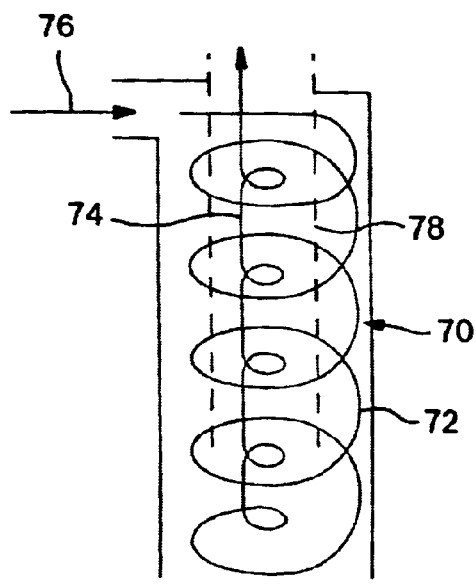
FIG. 3A illustrates the vortex pattern of a conventional cyclone with a vortex finder.
Figure 3B:
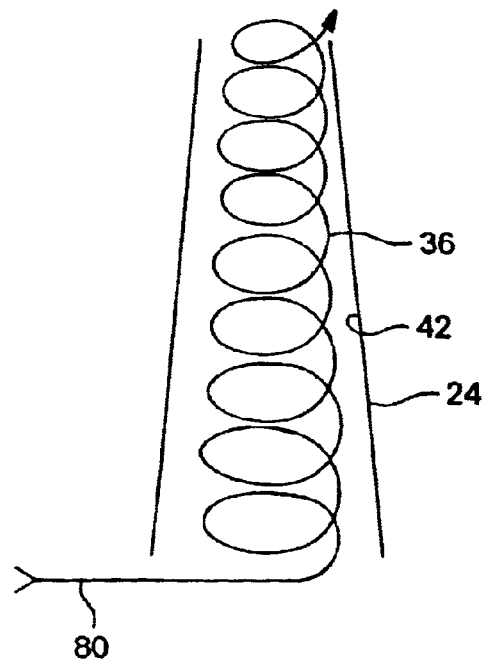
FIG. 3B illustrates the vortex pattern of the induced up-flowing vortex according to the present invention.

Referring now to FIGS. 3A and 3B, the importance of the novel stack application according to the invention will be described. The salient feature of the vortex motion inside the stack 24 is a continuous upward vortex swirl 36, as best shown in FIG. 3B. The conventional cyclone 70 has a downward vortex 72 and an upward vortex 74 inside the cyclone confinement, as best shown in FIG. 3A. When the tangentially injected gas-particle mixture 76 is introduced into a conventional cyclone 70 as shown in FIG. 3A, it forms a downward vortex 72 spiraling down until the momentum of the stream is exhausted and converted into an upflowing vortex 74 within the inside of the downward vortex 72. These two connecting vortices 72, 74 must be physically separated in all high efficiency cyclone designs. Otherwise, cyclone particle separation efficiency is reduced. A cylindrical sleeve 78 is frequently inserted into the cyclone body 70 to segregate the connecting vortices 72, 74. This inserted sleeve 78 is known as the vortex finder, and it also serves as the outlet port for the cyclone.

The stationary twisted ribbons 40 of the invention that induce the up-flowing spiral vortex 36 may be made with corrosive resistant and light transmitting materials. The momentum of the incoming flue gas 34, 80, when coupled with the vortex forming ribbons 40, will form the vortex swirls 36 such that the flue gas flows in the upward direction. Rotating the twisted ribbons 40 within the stack 24 can further increase the momentum of the up-flowing flue gas vortex swirls 36.

Upward-flowing spiraling vortex swirls 36 are formed by the high velocity tangential flue gas injection 34, 80 and are thereafter maintained by the twisting ribbons 40 formed by light emitting optical fibers. As stated previously, by entering the stack in a tangential direction relative to the circular cross-section of the stack and by increasing the inlet velocity of the flue gas stream 34, the centrifugal force field is maximized and collection efficiency is improved.

Figure 4:
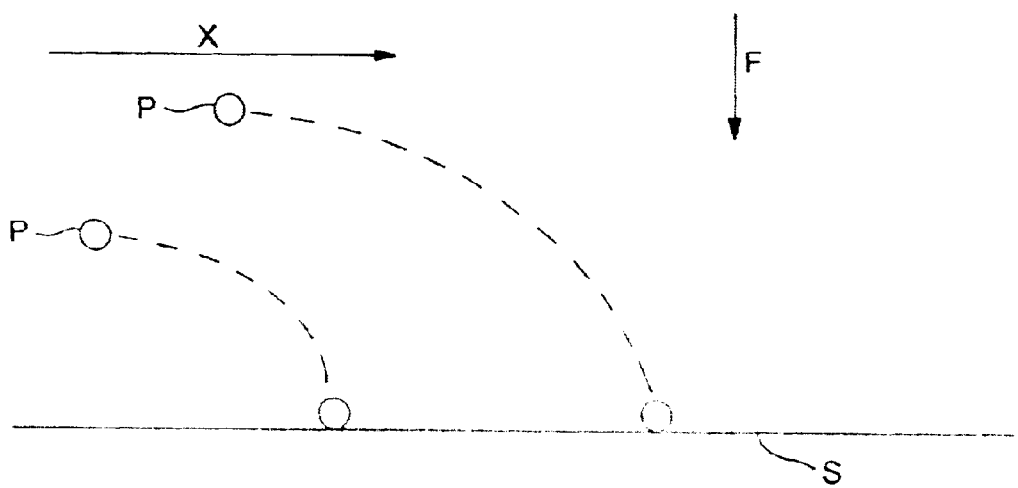
FIG. 4 illustrated a model for a crucial retention time arc within the novel stack according to the invention.

All the particle capture mechanisms are the net result of forcing particles to move toward the capture surface 42. The force field can be electrostatic, or centrifugal. The net forces acting upon the particles prompt them to move toward the capture surface for capture. This is illustrated in FIG. 4, which depicts a crucial particle flight path. It takes a finite length of time for the particles P to travel through the flue gas stream X before reaching the capture surface S. Various particles P, due to their physical properties, will travel through the flue gas stream X toward the capture surface S at various velocities caused by the force fields F exerted on them. Recent developments in multi-phase flow for dilute phases enables the construction of a mathematical model to depict the particle movement inside the flue gas.

Tall stacks in conventional coal-fired plants can provide long residence time for particle capture. Conventional centrifugal cyclones suffer from insufficient residence time for the particles to reach the wall of the cyclone to be captured. The interference of the inner upmoving vortex with the downward flowing vortex inside a conventional cyclone reduces the separation efficiency. This is a main reason for the use of a vortex finder 78 to segregate these two vortices.

According to the present invention, the singular upflowing vortex generated by the tangential introduction of flue gas and maintained/guided by the centrally located twisted optical fiber ribbon 40 provides a relatively long residence time in a strong centrifugal force field. The "re-entrainment" of the captured or retained particles into the flue gas is precluded by the cascading water or mixture of algae and water. This arrangement will show a high dust collection efficiency.

The carbon dioxide sequestration reaction is not limited to the photosynthesis reaction discussed above. In an alternate embodiment, aqueous ammonia is utilized to sequester $CO_2$ into ammonium bicarbonate, a nitrogen fertilizer. Such a product will contribute side benefits, such as the removal of acid gases, for example $SO_2$ and $NO_x$, to form respective sulfate and nitrate salts, also fertilizers.

Ammonium bicarbonate, also know as ammonia hydrogen carbonate or ammonia acid carbonate, is the only compound in the $NH_3$—$H_2O$—$CO_2$ system that dissolves in water without decomposition. In this case, decomposition does not occur until temperatures reach 140 degrees Fahrenheit and it does not melt until 225 degrees Fahrenheit under fast heating. High concentrations of ammonia in the aqueous solution will cause premature escape of ammonia and decomposition of ammonium bicarbonate at 140 degrees Fahrenheit. Therefore, for practical purposes, less than saturated aqueous ammonia solutions are preferred. However, these may vary depending upon the individual design and possible in-situ cooling provisions. The resulting exothermic reaction of the above process produces the most efficient results when occurring in a packed column, with twisted flow inducing ribbons. The ammonium ion, in the form of ammonia, ammonium hydroxide, amines, or any chemical compound yielding the ammonium ion ($NH_4^+$), is added to the flue gas upon the injection into the stack 24.

During hydrolysis, ammonium carbonate yields the ammonium ion, which is readily taken up by plant life, and bicarbonates, which percolate into the earth crust and subsequently form stable compounds with alkaline earth metals to form $CaCO_3$ or $MgCO_3$ for permanent carbon dioxide sequestration. Therefore, the carbon dioxide is sequestered as ammonium carbonates or bicarbonate, e.g., $NH_4HCO_3$, in a form which gives permanent sequestration of the $CO_2$ within the ground as a fertilizer.

Ammonia, or compounds containing ammonium ion, may be added to the algae-laden water also. Other means of sequestration, such as the absorption of $CO_2$ by amines, milk of limestone $Ca(OH)_2$ etc., are also possible. But, the final products may vary.

Having thus described various exemplary embodiments of the invention, it will be understood by those skilled in the art that modifications or changes in details of the invention may be implemented without departing from the spirit and scope of the invention as defined in the following claims.

What is claimed is:

1. A system for sequestering small particles and carbon dioxide in a coal-fired power generation process comprising:

a. combustion means for combusting a mixture of oxygen and coal and generating flue gas and products of combustion;

b. a stack in communication with said combustion means for collection and dispersion of the flue gas and the products of combustion;

c. means for supplying the flue gas to said stack; and d. means for cascading and recirculating a stream of water within said stack to form a slurry from a mixture of algae-laden water and the products of combustion from said stack.

2. The system according to claim 1, further comprising means for illuminating an interior of said stack and inducing a photosynthesis reaction between the flue gas, the products of combustion, and the stream of algae-laden water, said photosynthesis reaction producing a glucose by-product in the slurry.

3. The system according to claim 2, wherein said illumination means comprises a light extraction device located inside said combustion means which extracts light emitted during combustion, and a plurality of twisted spiraling optical fiber ribbons in said stack transmitting and emitting the light within said stack to initiate said photosynthesis reaction.

4. The system according to claim 3, wherein said light extraction device comprises a laser device.

5. The system according to claim 1, wherein said stack includes an interior stack wall, and the stream of water cascades downwardly from a top of said stack wall, and said stack wall is constructed of a corrosion resistant material.

6. The system according to claim 1, further comprising means for supplying an ammonium salt to said stack.

7. The system according to claim 6, wherein said ammonium salt is chosen from the group consisting of amines, ammonia, ammonium hydroxide, and combinations thereof.

8. The system according to claims 6, wherein said ammonium salt is chosen from the group consisting of amines, ammonia, ammonium hydroxide, and combinations thereof.

9. A system for virtual zero carbon dioxide emissions in a coal-fired power generation process comprising:

a. a burner for combusting a mixture of oxygen and coal and generating flue gas and products of combustion;

b. a stack in communication with said burner for collection and dispersion of the flue gas and the products of combustion; and c. a vortex generator for generating an upward-flowing vortex of flue gas, the vortex directs dust particles and carbon dioxide entrained in the flue gas to an interior surface of said stack for collection and sequestration of dust particles and carbon dioxide; and d. a recycler for recycling oxygen-rich, carbon dioxide sequestered flue gas through an oxygen separation device thereby exhausting inert gases having virtually zero carbon dioxide emissions to the atmosphere and recycling highly concentrated oxygen which passes though said separation device back into said burner.

10. The system according to claim 9, further comprising: a cascading stream for cascading and recirculating a stream of water within said stack to form a slurry from a mixture of the water and collected products of combustion from said stack.

11. The system according to claim 10, wherein said water is algae-laden water.

12. The system according to claim 11, further comprising:
means for illuminating an interior of said stack and inducing a photosynthesis reaction between the flue gas, and the products of combustion, and the stream of algae-laden water, said photosynthesis reaction producing a glucose-type by-product in the slurry.

13. The system according to claim 10, further comprising means for supplying an ammonium salt to said stack.

14. The system according to claim 11, further comprising means for supplying an ammonium salt to said stack.

15. The system according to claim 13, wherein said ammonium salt is chosen from the group consisting of amines, ammonia, ammonium hydroxide, and combinations thereof.

16. The system according to claim 14, wherein said ammonium salt is chosen from the group consisting of amines, ammonia, ammonium hydroxide, and combinations thereof.

* * * * *